Nov. 7, 1933.    C. E. RUPPELT    1,934,330
LOCK JOINT SEAM
Filed July 22, 1932    2 Sheets-Sheet 1
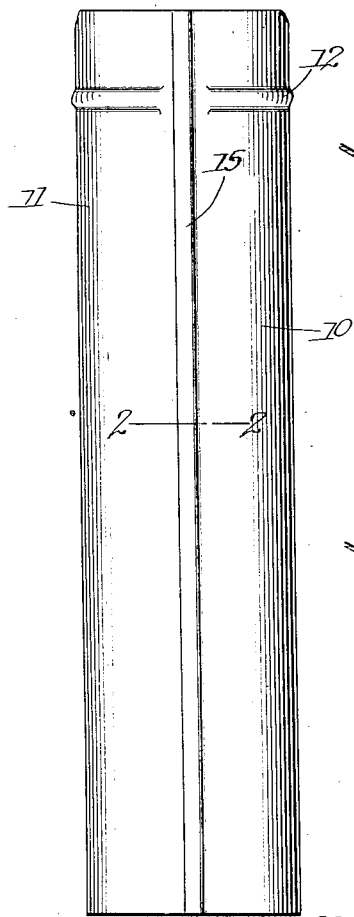
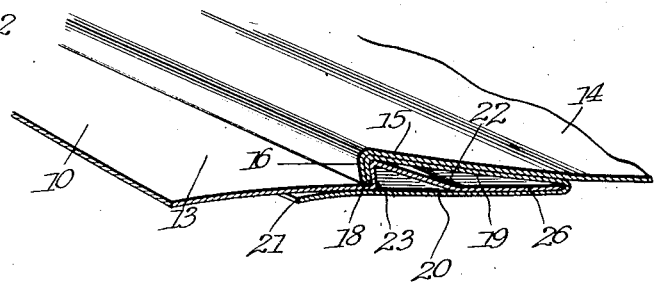
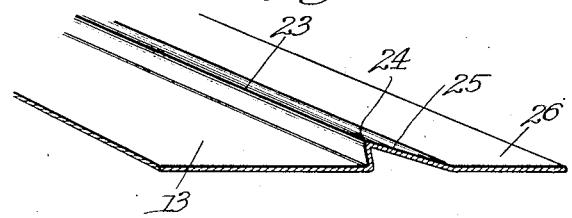
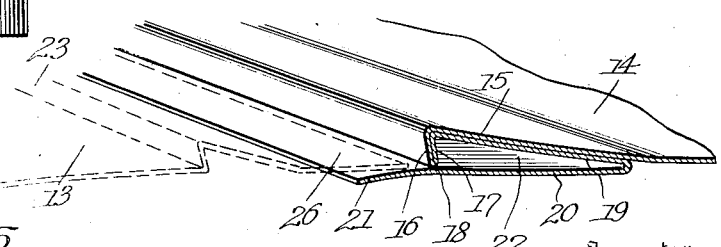
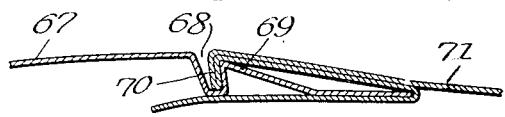
Inventor
Clarence E. Ruppelt
By Cushman, Bryant, Darby & Cushman
Attorneys Nov. 7, 1933.  C. E. RUPPELT  1,934,330
LOCK JOINT SEAM
Filed July 22, 1932  2 Sheets-Sheet 2

Inventor
Clarence E. Ruppelt
By Cushman, Byrant, Derby & Cushman
Attorneys

Patented Nov. 7, 1933

1,934,330

UNITED STATES PATENT OFFICE 1,934,330

LOCK JOINT SEAM

Clarence E. Ruppelt, Canonsburg, Pa.

Application July 22, 1932. Serial No. 624,107

11 Claims. (Cl. 126—309)

The present invention relates to an improved self-locking joint seam and more particularly to means for positively and securely connecting the opposed edges of a stove pipe or the like.

Pipe joints of the self-locking type as heretofore made, have been open to the objection that when subjected to expansion or heavy strain, the joint opens up, thus materially impairing its efficiency. Furthermore, most of the self-locking stove pipe joints as previously constructed have been provided with an intervening fold between the locking instrumentality and the wall of the pipe, which fold weakens the joint when it is subjected to excessive strain or expansion.

A primary object of the present invention is to provide a self-locking pipe joint seam which, when set up, forms an interlocking connection capable of withstanding the expansive strains to which the pipe is subjected and which provides a positive and secure joint of stronger construction than has heretofore been obtainable.

A further object is to provide a simple, efficient and economical interlocking joint or seam for sheet metal pipe sections, in which the blank from which the pipe is formed may be nested or packed conveniently for shipment and the joint set up at a minimum expenditure of time and labor.

Another object of the invention comprehends the provision of means for connecting the opposed edges or peripheral wall of the pipe directly and without an intervening bend or folded portion so that the joint thus formed is capable of withstanding the excessive strains to which the pipe is subjected.

Other objects and advantages of the invention will become apparent from the following description, when taken in conjunction with the accompanying claims and drawings.

Referring to the drawings, in which is shown several preferred embodiments of the invention, Figure 1 is a side view of a pipe section provided with my improved lock joint seam.

Figure 2 is an enlarged sectional view taken substantially along the line 2—2 of Figure 1.

Figure 3 is a detail perspective view of the male member of the locking joint.

Figure 4 is a view similar to Figure 2, but showing the male member out of engagement with the female member of the pipe joint.

Figure 5:
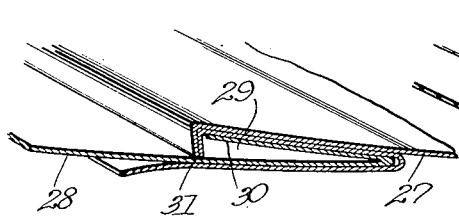
Figure 5 is a sectional view of a modified form of the invention.

Figures 8 to 14 inclusive, are sectional views of various modifications which the invention may assume.

Figure 15 shows a modified form of the invention for providing a smooth seam on the outside of the pipe.

Referring to the drawings, in which like numerals are designated by like parts in the various views, 10 indicates a blank of sheet metal, which, as shown in Figure 1, is bent to form a stove pipe or pipe section 11 of any desired length and diameter. The pipe 10 is provided with the usual fluting 12, and has its opposed longitudinal edges 13 and 14 arranged to constitute the interfitting male and female members, respectively, of the self-locking joint.

The female member 14 preferably is inclined upwardly, as at 15, (Figure 4), and then is bent or turned laterally at an angle, as at 16, and then reversed upon itself at 17 to form the double walled abutment 18 which may be disposed substantially at right angles to the wall 15 or arranged either at an acute or obtuse angle relatively to said wall 15. The portion 17 is bent rearwardly to form the portion 19 that extends parallel with the portion 15 for a limited distance. The portion 19 is then bent outwardly to form the single yieldable wall 20 that may extend beyond the abutment 18, and, preferably, terminates in an outwardly curved or flared portion 21 that tends to facilitate the introduction of the male member 13 into the female member 14. It will be seen that the portions 15 and 19 constitute a double wall which is spaced from the single inner wall 20 so as to form a substantially triangular-shaped pocket 22, the mouth of which is normally closed by the substantially radial abutment 18.

The male member 13 is provided with a complementary coacting abutment 23 which extends longitudinally thereof and is preferably formed by means of the laterally extending or offset portion 24 and the inclined portion 25 that terminates in the tongue 26 in substantial alignment with the wall of the male member 13 so as to form a continuation thereof. The pocket 22 is of such a length as to receive the abutment 23 and the tongue 26. It will be seen that when the joint is being set up the tongue 26 is first inserted into the mouth of the pocket 22 between the abutment 18 and the wall 20 (Figure 4). The abutment 18 during this operation rides up the inclined portion 25 of the male member until the tongue is wholly positioned within the pocket, at which point the abutment 18 reaches the end of the inclined portion 25 and drops down with a "snap" action into engagement with the wall 24 of the abutment 23 to assume the interlocking position, as shown in Figure 2.

The single wall 20 of the female member is preferably arranged to be positioned adjacent the inner peripheral wall of the pipe when the joint is set up, so that the inner wall of the pipe will be provided with a tight seam that prevents soot or other foreign matter from collecting or working its way through the joint. In order to facilitate the introduction of the male member 13 into the pocket 22, the single wall 20 may be provided with the flared portion 21 which prevents catching of the male member 23 with parts of the female member.

In the modified form of the invention shown in Figure 5, the female member 27 is substantially similar to the form previously described. However, the male member 28, which extends into the pocket 29 has its outer end bent rearwardly and upwardly, as at 30, so that its end may engage the complementary abutment 31 formed in the female member at the mouth of the opening 29.

Figure 6:
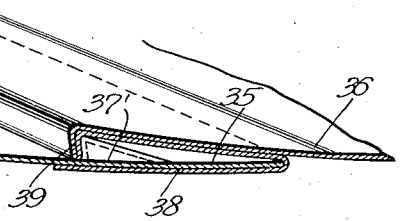
Figure 6 is a sectional view of a further modification.
Figure 7:
Figure 7 is a detailed view of the male member shown in Figure 6.

In the forms of the invention shown in Figures 6 and 7, the male member 32 is offset or depressed to form the locking abutment 33 that terminate in the tongue or outer end 34. In order to prevent catching and permit the easy insertion of the male member 32 into the pocket 35 of the female member 36, the male member along the abutment 33 may be provided with spaced V-shaped depressions 37 which form at their apex the guide ribs 37' that coact with the inner single wall 38 of the female member to facilitate the introduction of the male member into the pocket of the female member and the locking engagement of the abutment 33 with its complementary abutment 39.

Figure 8:
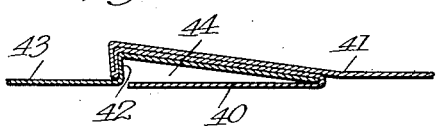
Figure 9:
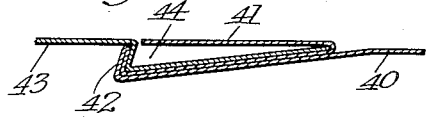

The joint shown in Figure 8 is substantially similar to that disclosed in Figure 2, with the exception that the outer single wall 40 of the female member 41 does not extend to the abutment 42 when the male member 43 is inserted in the pocket 44. The form illustrated in Fig. 9 is substantially similar to that shown in Figure 8 with the parts reversed.

Figure 10:
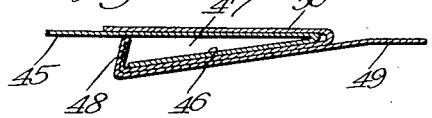
Figure 11:
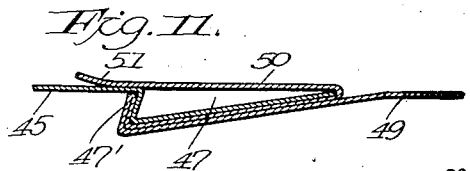

In Figure 10, the male member 45 has its outer end bent downwardly upon itself to provide the inclined arm 46 that fits within the pocket 47 and has its end arranged to engage the inclined abutment 48 of the female member 49. The single outer wall 50 extends beyond the abutment 48 so as to yieldably bear against the adjacent surface of the male member 45 when the latter is inserted in the pocket 47. The form illustrated in Figure 11 is substantially similar to Figure 10, with the exception that the outer single wall 50 is provided with a flared end 51 which extends beyond the abutment 47' so as to facilitate the introduction of the male member 45 into the pocket 47.

Figure 12:
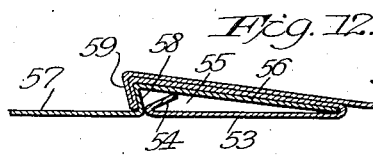
Figure 13:
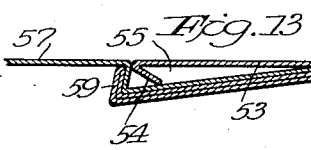

In Figure 12, the female member 52 has its inner single wall 53 terminating in an upwardly inclined plane 54 that extends within the pocket 55 so as to yieldably bear against the tongue 56 of the male member 57. It will be noted that in this form of the invention the abutment 58 of the male member is formed at an acute angle therewith so as to coact with the complementary abutment 59 on the female member 52 for maintaining the joint firmly in position. The joint shown in Figure 13 is the same as that shown in Figure 12 but with the parts reversed.

Figure 14:
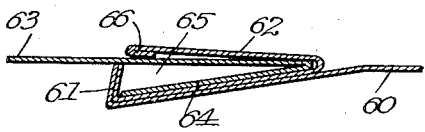

In the modification shown in Figure 14, the female member 60 is provided with a double wall abutment 61 that extends inwardly towards the outer single wall 62 while the male member 63 has its end portion 64 bent upon itself and inclined so as to fit within the pocket 65 and engage the abutment 61. The wall 62 is bent rearwardly at its end to form the bead 66 that yieldably engages the adjacent surface of the male member 63 when the joint is set up.

It will be noted that a characteristic feature of the locking joint formed in accordance with the present invention resides in forming the joint seam directly on the periphery of the pipe wall, thus avoiding the use of an intervening fold portion which has been found to be defective, since the intervening fold causes the joint to open up when the pipe is subjected to heavy strains of thermal changes. Moreover, the double wall abutment 18 of the female member strengthens the joint and lessens the danger of the parts becoming loose and creating a fire hazard. In other words, by reason of the joint being formed directly on the periphery of the pipe, there is produced an exceptionally strong interlocking joint seam which is capable of withstanding the heavy strains to which the pipe is ordinarily subjected. It will be observed that the interlocking abutments are of relatively short length, in fact, the length of these abutments are preferably between one-sixteenth ($\frac{1}{16}$th) and three thirty-seconds ($\frac{3}{32}$nds) inches, since it has been found that the smaller or shorter the abutments, the greater the strain they are capable of withstanding. Obviously, the length of the abutments as well as the depth of the pocket that receives the male member may be varied as to size depending upon the particular use to which the joint is applied.

In order to provide a smooth seam on the outside of the pipe, the male member 67 (Figure 15) may be provided with a depression or offset portion 68 formed in front of the rib 69 and of sufficient depth to receive the abutment 70 of the female member 71 so that when the joint is set up the outer wall of the male and female members will be in alignment or flush with each other.

The pipe 11 may be cylindrical, oval or any other desired shape since my joint has been found to provide a firm and secure interlocking connection between the opposed edges of the pipe irrespective of the shape thereof.

While I have, for the purpose of illustration, shown the joint associated with a stove pipe, it is to be understood that the same may equally be employed for interlocking the opposed edges of various other articles. Moreover, the various forms illustrated may have their parts reversed without departing from the invention, since the cardinal feature consists in the provision of a joint arranged directly on the periphery of the pipe without the necessity of providing an intervening fold or bent portion.

Manifestly, the invention may assume various other forms without departing from the spirit of the invention and the scope of the appended claims.

I claim:

1. A pipe joint of the class described, including a female member and an interfitting male member, said female member having a portion extending backwardly upon itself to provide a double wall portion and then forwardly to form a single inner end wall, the space between the double wall and the single wall forming a substantially triangular shaped pocket, the outer end of the double wall extending inwardly towards the single wall at the mouth of the pocket to form a substantially radial abutment, said male member having a longitudinally offset portion adjacent its end, said offset portion arranged to fit within the pocket and engage said abutment when the joint is set up.

2. A pipe joint of the class described, including a female member and an interfitting male member, said female member having a portion extending backwardly upon itself to form a double wall portion and then forwardly to provide a single inner end wall, the space between the double wall and the single wall forming a substantially triangular-shaped pocket for the reception of the male member, the outer end of the double wall extending inwardly at an angle towards the single wall to provide a substantially radial abutment, said male member having a longitudinally offset portion adjacent its end, said offset portion arranged to fit within the pocket and engage said abutment when the joint is set up, said inner end wall of the female member being flared and extending beyond said offset portion of the male member to facilitate the introduction of the male member into the female member.

3. A pipe joint of the class described, including a female member and an interlocking male member, said female member having a portion extending backwardly upon itself to provide a double wall and then forwardly to form a single inwardly curved yieldable end wall, the space between the double wall and the single wall forming a substantially triangular-shaped pocket for the reception of the male member, the outer end of the double wall having a substantially radial projection extending inwardly towards the single wall at the mouth of the pocket, said male member having a longitudinally disposed rib and a tongue arranged to be inserted in said female member, said rib adapted to coact with said abutment when the joint is set up to provide a positive and secure interlocking connection of the parts.

4. An interfitting pipe joint of the class described, including a female member and an interfitting male member, said female member having an edge portion extending rearwardly of the outer wall thereof to form a double wall and then forwardly to provide a single wall, the space between the double wall and single wall constituting a triangular-shaped pocket for the reception of the male member, the outer end of the double wall extending toward the single wall at the mouth of the pocket to form a substantially radial abutment, said male member having complementary coacting abutting means engaging said radial abutment for securely maintaining the parts in position when the joint is set up, and means for preventing catching of the male member with parts of the female member when the former is being inserted into the latter.

5. An interfitting pipe joint of the class described, including a female member and an interfitting male member, said female member having an edge portion extending rearwardly of the outer wall thereof to form a double wall and then forwardly to provide a single wall, the space between the double wall and single wall constituting a pocket for the reception of the male member, the outer end of the double wall extending toward the single wall at the mouth of the pocket to form a substantially radial abutment, said male member having complementary abutting means engaging said radial abutment for maintaining the parts in locked position, the abutting means on the male member having spaced depressions forming guide ribs for engaging the inner single wall of the female member to prevent catching of the parts when the joint is set up.

6. An interfitting pipe joint of the class described, including a female member and an interfitting male member, said female member having an edge portion extending rearwardly of the outer wall thereof to form a double wall and then forwardly to provide a single wall, the space between the double wall and single wall constituting a triangular-shaped pocket for the reception of the male member, the outer end of the double wall extending toward the single wall at the mouth of the pocket to form a substantially radial abutment, said male member having complementary abutting means engaging said radial abutment for securely maintaining the parts in position when the joint is set up, the single wall of said female member having a flared outer edge for facilitating the introduction of the male member into the female member without catching of the parts.

7. An interlocking joint of the class described, including a female member and an interfitting male member, said female member having a portion extending inwardly to form a radial abutment and rearwardly to provide a double wall and then forwardly beyond said abutment to form a single inner wall, the space between the double wall and the single inner wall providing a triangular-shaped pocket for the reception of the male member, said abutment being located at the mouth of the pocket, said male member provided with a complementary abutment and a yieldable tongue arranged to fit within said pocket in the rear of the abutment on said female member, whereby to provide a tight joint when the parts are set up.

8. An interlocking pipe joint of the class described, including a female member and an interfitting male member, said female member having a portion extending rearwardly of the outer wall thereof to form a double wall and then forwardly to provide a flexible tongue, the space between the double wall and said tongue forming a triangular pocket for the reception of the male member, the outer end of the double wall having a substantially radial abutment adjacent the mouth of the pocket and said male member provided with a complementary abutment arranged to engage the rear of the abutment on the female member when the joint is set up, said tongue overlapping said abutments and having an outwardly flared end to facilitate the insertion of the male member into the female member.

9. A pipe joint of the class described, including a female member and an interfitting male member, said female member having an edge portion extending backwardly upon itself to provide a double wall portion and then forwardly to form a single inner end wall, the space between the double wall and the single wall forming a pocket, the outer end of the double wall extending inwardly towards the single wall at the mouth of the pocket to form an abutment, said male member having a depression therein arranged to receive said abutment when the joint is set up so as to provide a smooth seam on the outside of the pipe.

10. A pipe joint of the class described, including a female member and an interfitting male member, said female member having an edge portion extending backwardly upon itself to provide a double wall portion and then forwardly to form a single inner end wall, the space between the double wall and the single wall forming a pocket, the outer end of the double wall extending inwardly towards the single wall at the mouth of the pocket to form an abutment, said male member having a longitudinally offset portion and a depression, said offset portion arranged to fit within the pocket when the joint is set up, the abutment on the female member adapted to fit within the depression so as to provide a smooth seam on the outside of the pipe.

11. An interfitting pipe joint of the class described including a female member and an interfitting male member, said female member having a portion extending rearwardly of the outer wall thereof to form a double wall and then forwardly to provide a single wall, the space between the double wall and the single wall constituting a substantially triangular-shape pocket for the reception of the male member, the outer end of the double wall extending toward the single wall at the mouth of the pocket to form a substantially radial abutment, and said male member having complementary coacting means engaging said radial abutment when the joint is set up to provide a positive and secure interlocking connection of the parts.

CLARENCE E. RUPPELT.